April 30, 1968     M. A. PIGET     3,380,769
STRUCTURAL MEMBERS FOR INTERCONNECTING PANELS TO FORM
SHELVING, FURNITURE, DOORS AND THE LIKE
Filed Nov. 12, 1965     2 Sheets-Sheet 1
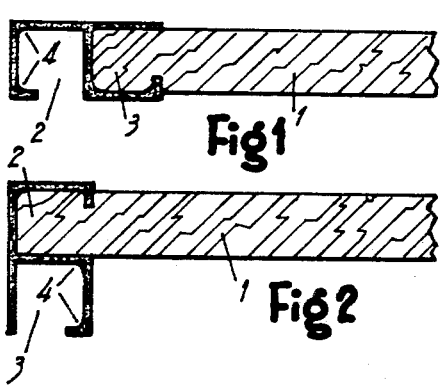
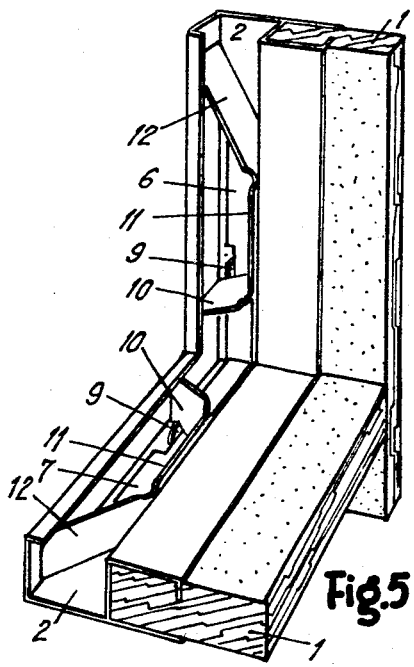
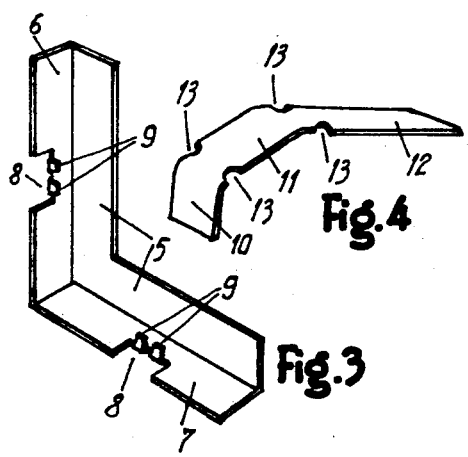
INVENTOR
Maurice A. Piget
By Lane, Aitken, Dunner & Ziems
Attorneys

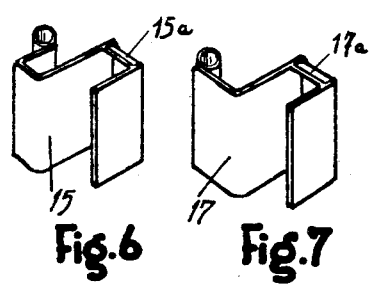
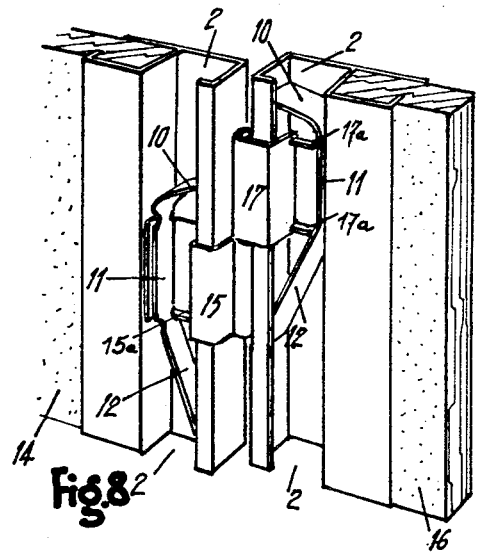
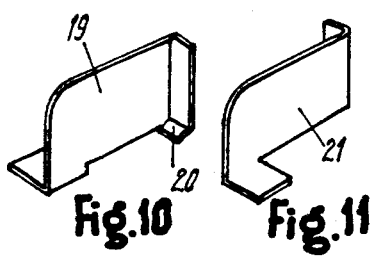
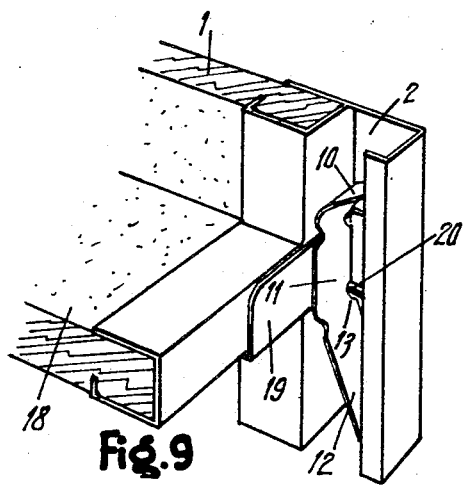
INVENTOR
Maurice A. Piget

United States Patent Office 3,380,769
Patented Apr. 30, 1968

3,380,769
STRUCTURAL MEMBERS FOR INTERCONNECT-
ING PANELS TO FORM SHELVING, FURNITURE,
DOORS AND THE LIKE
Maurice A. Piget, 2 Rue Breuvery,
Saint-Germain-en-Laye, France
Filed Nov. 12, 1965, Ser. No. 507,332
Claims priority, application France, Nov. 18, 1964,
995,394; Oct. 22, 1965, 36,563
5 Claims. (Cl. 287—189.36)

ABSTRACT OF THE DISCLOSURE

This disclosure includes a drawing and description of an assembly of panel members in which at least one of the panel members is formed with an edge profile having a channel-shaped inlet extending longitudinally thereof. The assembly of this panel with another panel is effected by a spring plate shaped to be stressed when received in the inlet and formed with notches to engage a member to be connected to the other of the panels. The last mentioned member may be in the form of a hinge or other suitable bracket for securing the assembly of panels.

The present invention relates to structural members for interconnecting panels to form shelving, furniture, doors and the like.

The object of the invention is to provide structural members for the purpose set out above which are of simple construction and form a rigid but easily removable assembly when joined together.

In accordance with the present invention, panel members are interconnected by providing one of the members with a metal edge profile having a pair of mutually perpendicular, longitudinal recesses, one of which is adapted to receive a panel filler. A connecting member in the form of a spring, shaped to be stressed when received in the other of the recesses, is formed with notches to engage a bracket or hinge engageable with another of the panels to be interconnected.

In the accompanying drawings:

FIG. 1 is a cross-sectional view through a metal section having two perpendicular inlets with internally rounded corners, according to the present invention, showing a filler panel mounted in one inlet.

FIG. 2 is a cross-sectional view showing the filler panel mounted in the other inlet.

FIG. 3 is a perspective view of an angled member used for joining two metal sections together at a right-angle to one another.

FIG. 4 is a perspective view of a spring plate which is used in conjunction with the angled member shown in FIG. 3.

FIG. 5 is a perspective view of two panels shown in FIG. 1, joined together at right-angles to one another by utilizing the connecting members shown in FIGS. 3 and 4.

FIGS. 6 and 7 are perspective views of two hinge members shown in FIG. 8.

FIG. 8 is a perspective view of two filler panels hingedly connected together by using the hinge members shown in FIGS. 6 and 7.

FIG. 9 is a perspective view of one vertical filler panel shown in FIG. 1, joined at a right-angle to one horizontal corbel panel, by utilizing the spring plate shown in FIG. 4 and two angles with unequal sides as shown in FIGS. 10 and 11.

FIGS. 10 and 11 are perspective views of two angles with unequal sides which are positioned, respectively, at opposite ends of the horizontal corbel panel shown in FIG. 9.

In carrying the invention into effect according to one convenient mode, by way of example, the metal sections shown in FIG. 1 or 2 have two perpendicular inlets or recesses 2 and 3, which in turn have internally rounded corners 4. A panel member 1 is slidably received in one of the recesses, while the other recess accommodates assembly members as hereinafter referred to.

Each of the arms of the angled member shown in FIG. 3 is L-shaped in cross-section, the flanges 5 of the respective arms being in the same plane while the associated flanges 6 and 7 are at right-angles to one another. A recessed portion 8 is formed in each of the flanges 6 and 7 and each recessed portion has a pair of inwardly directed, spaced tongues 9.

The spring plate shown in FIG. 4 has angularly disposed surfaces 10, 11 and 12 with notches 13 formed on both side edges of the plate at the juncture of the surfaces 10, 11 and 11, 12 respectively. On assembling two panel members 1 at right-angles to one another as shown in FIG. 5, the angled member and spring plate are inserted in the unoccupied recess of the metal section with the surface 10 positioned between the spaced tongues 9 of the angled member and the corners of the ends of the surfaces 10 and 12 frictionally engaging the rounded corners 4 of the metal section to act as an anchorage. The surface 11 engages the opposite wall of the metal section as shown in FIG. 5. The notches 13 make it possible to integrate the spring plate with a member to which it is connected, as can be seen for example in FIG. 9.

FIG. 8 illustrates the invention as applied to a fixed frame having a door hingedly mounted thereon. The filler panel 14 is received in the recess 3 of a metal section as shown in FIG. 1 which constitutes the fixed door frame, and the filler panel 16 mounted in the recess 3 of a similar metal section, constitutes the door member.

The respective recesses 2 of the metal sections each have a spring plate positioned therein as described above, with which is associated hinge members 15 and 17 having spaced, inwardly directed lips 15a and 17a respectively. The hinge member 15 is mounted in the fixed door frame and the hinge member 17 is mounted in the door member, the respective lips 15a and 17a engaging the notches 13 of the spring plate. The hinge members 15, 17 are each provided with a cylindrical portion which, when assembled as shown in FIG. 8, align with one another to receive a pin or spindle about which the door member 16 hinges.

FIG. 9 shows a vertical panel 1 and a horizontal corbel panel 18 mounted at right-angles thereto. The panel 1 is received in the recess 3 of a metal section similar to that shown in FIG. 1 and the panel 18 is supported by two angles with unequal sides 19 and 21 as shown in FIGS. 10 and 11. The recess 2 of the metal section has a spring plate positioned therein as described above, with which is associated a right-angled support bracket 19 for supporting one end of the panel 18. The support bracket 19 is provided with an inwardly directed lip 20 which engages in a notch 13 in the spring plate. The other end of the panel 18 is supported in a similar manner by an angle with unequal sides 21 and a spring plate.

It will be appreciated that, in all the embodiments described above, the frictional engagement of the ends of the surfaces 10 and 12 with the rounded corners 4 of the metal section permits height adjustment of the spring plate to be readily effected.

I claim:

1. A connector for attaching an element to a metal section having a channel-shaped recess therein, said connector comprising: a spring plate having a central portion extending between end portions, said end portions projecting angularly in divergent relation from the same side of said central portion, said plate also having notches formed in the edges thereof at the juncture of said end portions and said central portion, and an element engaging member having a flat portion and means defining a lip projecting inwardly from one edge of said flat portion, said spring plate being receivable in the channel shaped recess of the metal section with the central portion thereof overlying the flat portion of said element engaging member and urging it into contact with one side of the recess, the ends of said spring member frictionally engaging the opposite side of the recess, and said lip being received in one of said notches.

2. In an assembly of two or more panels, at least one of which is formed with an edge profile having a pair of mutually perpendicular channel-shaped inlets, said one panel also including a filler anchored in one of said inlets, the other of said inlets being open, means for interconnecting said panels comprising: a spring plate having a central portion extending between end portions, said end portions projecting angularly in divergent relation from the same side of said central portion, said plate also having notches formed in the edges thereof at the juncture of said end portions and said central portion, said spring plate being receivable within said open inlet with said central portion and end portion thereof facing opposite sides of said open inlet, and a member connected to the other of said panels, said member having a flat portion positioned between said central portion of said spring plate and one side of said inlet, and means on said member defining a lip projecting inwardly from one edge of said flat portion, said lip being received in one of said notches.

3. The apparatus recited in claim 2 wherein said member includes a hinge portion projecting out of said inlet wherein the other of said panels carries a complementing hinge pivotally connectable to said hinge portion.

4. The apparatus recited in claim 2 wherein the other of said panels is a horizontal corbel panel and wherein said member includes a flange portion extending horizontally from said flat portion to support the other of said panels.

5. The apparatus recited in claim 2, wherein the internal corners of the profile are rounded and the ends of the spring plate engage said rounded corners.

References Cited

UNITED STATES PATENTS 3,216,539   11/1965   Piget _____ 287—189.36

EDWARD C. ALLEN, *Primary Examiner.*